Patented June 18, 1929.

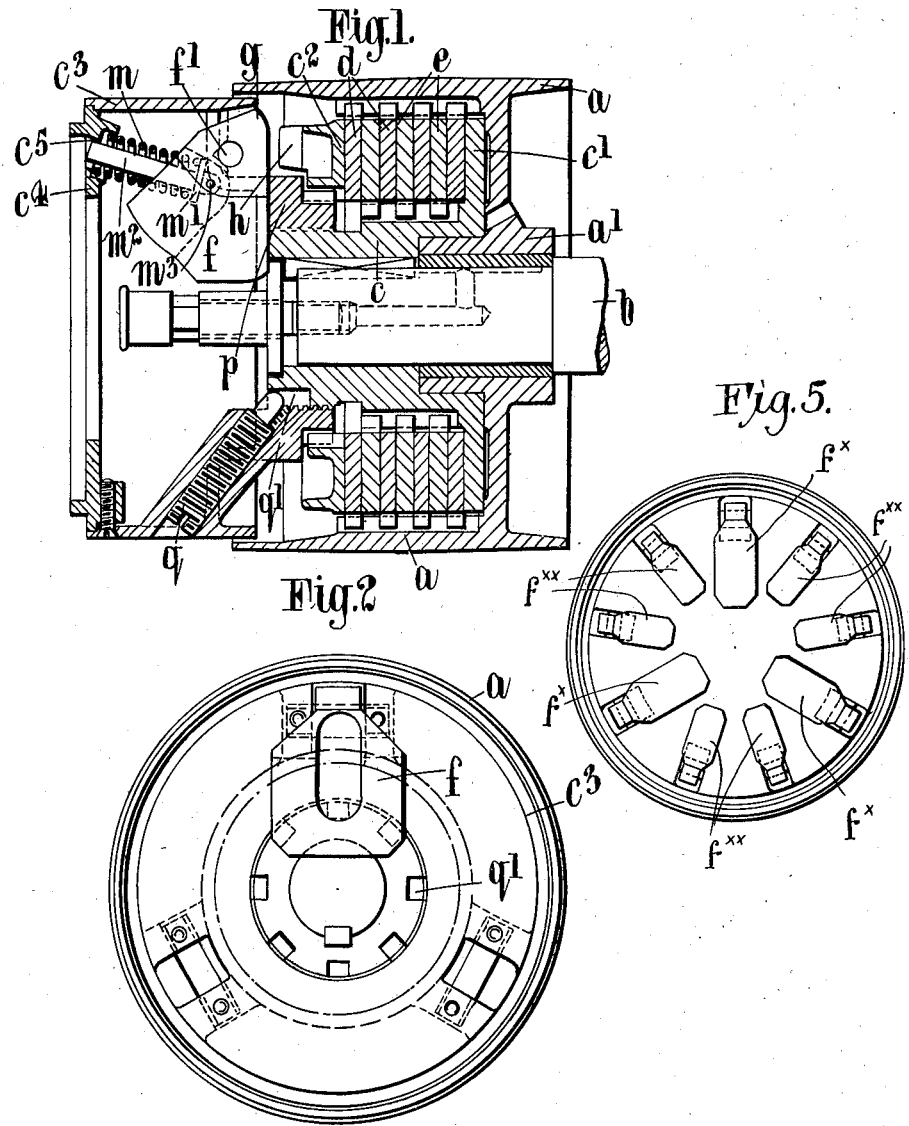
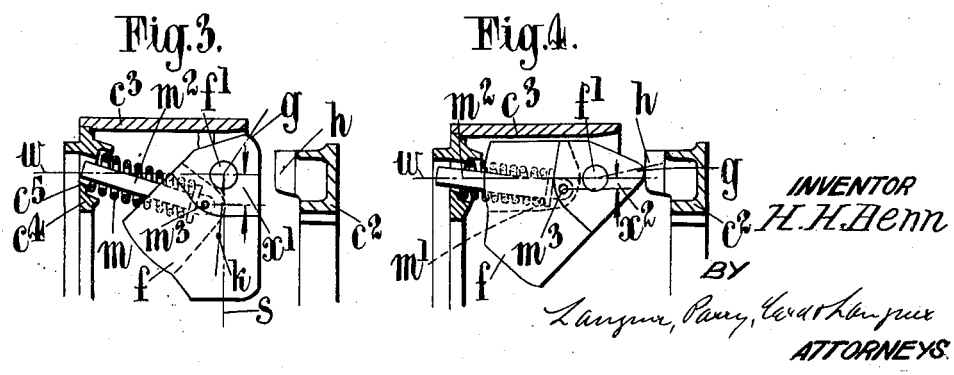

1,718,105

UNITED STATES PATENT OFFICE.

HANS HAMILTON BENN, OF FARNHAM COMMON, ENGLAND.

FRICTION CLUTCH.

Application filed August 16, 1926, Serial No. 129,587, and in Great Britain April 24, 1926.

This invention relates to friction clutches of the centrifugal type, and has for its chief object to provide an improved friction clutch that is inoperative until a certain predetermined speed is reached, whereupon a strong and stable clutching action is at once obtained.

The improved clutch is particularly useful for transmitting the driving effort of induction motors having short circuited armatures or other types of motors or oil engines having low starting torque, as it allows such a motor to be brought up to its proper speed at no load, and then to become automatically loaded.

A further feature of the invention particularly applicable to induction motors consists in arranging the centrifugally sensitive weights so that some of them will become effective at a lower speed than the remainder, as hereinafter described.

One form of construction of the invention is illustrated in the accompanying drawings in which:—

Fig. 1 is a longitudinal section of an arrangement embodying my improved clutch.

Fig. 2 is an end view.

Figs. 3 and 4 are details of a centrifugal weight in different positions, and Figure 5 is a similar view of a modification.

In the arrangement illustrated it is assumed that the armature shaft $b$ of an electric induction motor is to be coupled to a belt pulley $a$. The hub $a'$ of the pulley $a$ runs idle on the shaft $b$. On this shaft is keyed the hub portion $c$ of a clutch of the multiple disc type, the friction discs $d$ and $e$ of which are gripped between the stationary end plate $c'$ and a loose annular end plate $c^2$. The successive discs are alternately in driving connection with the hub portion $c$ and the belt pulley $a$, as by external and internal teeth slidably engaging in grooves therein.

In a projecting housing $c^3$ three symmetrically arranged centrifugal weights $f$ are rotatably mounted upon suitably supported pins $f'$ so that the contact surface or nose $g$ of each weight can come into contact with a thrust member $h$ of the annular end plate $c^2$.

If the weights $f$ are so shaped that the dot-dash line in Fig. 3 joining the centre of gravity $k$ of each weight $f$ to the centre of the pivot pin $f'$ forms an angle with the line joining the centre of the pivot pin to the operating edge of the nose $g$, then the weight $f$ forms a bell cranked lever of which the arm $f'$ $g$ co-operates with the abutment $h$ on the movable end plate $c^2$ so as to give a toggle-like action in thrusting upon the friction discs.

Helical springs $m$ are supported in an annular cover plate $c^4$ in such manner that one end of each spring bears directly against the plate $c^4$, whilst the other end bears against a collar $m'$ on a guide bolt $m^2$, which is jointed to a cross-pin $m^3$ in the corresponding centrifugal weight $f$. For the sake of clearness, in the drawings the inside diameter of the helical spring $m$ is shown as greater than the diameter of the bolt $m^2$. It is, however, desirable to have the bolt so thick that it fits so closely into the spring as to prevent the latter from bending out of alignment. The bolts $m^2$ themselves can move freely backwards and forwards in the bores $c^5$ provided for their guidance.

The special arrangement or location of the spring $m$ is clearly indicated in Figs. 3 and 4, which show the initial and final positions, that is the unclutched and the clutched positions. The point of abutment of the spring against the annular cover plate $c^4$ is approximately on a level with the pivotal axis $f'$ of the weight, that is at the same distance as the latter from the geometrical axis of the clutch. The line running parallel to the latter through $f'$ is shown in dot-dash lines in Figs. 3 and 4 and is represented by $w$. The vertical distance of the point of engagement $m^3$ of the spring $m$ from the pivotal point $f'$ is represented by $x'$ in Fig. 3 and by $x^2$ in Fig. 4.

In the stationary position shown in Fig. 3 the axis of the spring $m$ forms a relatively large angle with the horizontal, which angle rapidly decreases with the displacement of the weight $f$, and finally reaches the minimum shown in Fig. 4.

The value $x^2$ is ordinarily so selected that the force of the spring tending to produce unclutching is just sufficient to start the weight moving towards the stationary position of Fig. 3 when the centrifugal forces acting are small. In the position shown in Fig. 4 the spring $m$ no longer exerts any considerable tendency to move the weight $f$ into the position of repose against the action of the centrifugal force.

The turning moment which each spring $m$ exerts upon its weight $f$ in the position shown in Fig. 3 is greater than that in the operative position shown in Fig. 4 to such an extent that (especially since the centre of gravity $k$ of each weight in the position shown in Fig. 3 is only a short distance from the transverse vertical plane $s$) the weight is held in the position shown in Fig. 3 at all speeds up to a predetermined limit above which the clutch is brought into full action practically at once.

Thereafter the clutch will remain operative even if the speed should drop considerably below the predetermined limit, as the opposing action of the springs has been greatly decreased.

A large drop in speed below the predetermined limit will, however, cause the disengagement of the clutch, due to the small counteracting effect of the springs above mentioned. This lower speed at which declutching occurs can also be predetermined, at any rate approximately.

Thus the motor will start idly and continue so until it reaches approximately full speed. Before the latter is reached the centrifugal force on the weights $f$ is so great that the opposing force of the springs $m$ is overcome. The weights now diverge rapidly, that is change their position from that shown in Fig. 3 to that shown in Fig. 4, so that the clutch is almost instantaneously thrown into gear.

In other words this outward movement of the weights takes place as soon as the effort exerted upon them by the centrifugal force overcomes the opposing effort of the springs, and then in consequence of the diminution of leverage of the springs as represented by the difference between the values $x'$ and $x^2$ the effect of the springs is quickly reduced from a maximum to a minimum. Thus a large clutching action is immediately brought about without further increase of speed.

My improved clutch is therefore especially suitable for transmitting the driving effort of an induction motor with short-circuited armature because as is known when starting such motors under load in the customary manner an undesirably heavy starting current is produced, whereas my improved clutch enables the motor to be started under no load and to be automatically loaded only when it has attained its proper speed, while a large overload will automatically effect the disengagement of the clutch, before the slip reaches a dangerously high value.

As the effect of the springs depends directly on their strength, the same friction clutch can be used for a considerable range of speeds by merely changing the springs. All that is necessary is to change the strength of the springs in such a way that when the new predetermined speed is attained, the force of the springs will be overcome by the centrifugal force.

The parts $c^3$ and $c^4$ form a so-called lever housing, as the lever weights $f$ are housed therein. The cylindrical part $c^3$ has its hub $p$ screwed on to the hub portion $c$ of the clutch so that the position of the lever housing $c^3$, $c^4$ relatively to the hub-portion $c$ can be varied in the direction of the axis of the shaft $b$ by relative rotation. A threaded bolt $q$ is provided in the part $c^3$ in an oblique position, accessible from the exterior, said bolt being adapted to engage one of a series of radial slots $q'$ formed in the hub portion $c$ in order to secure the hub portion $c$ and the lever housing in their desired relative positions. The further the lever housing is from the clutch, as shown in Fig. 1, that is, towards the left, the more the toggle straightens at the end or working position of the bell crank arm $f'$ $g$ constituting one of the toggle arms (Fig. 4), and therefore the greater the pressure exerted by the nose $g$. If the lever housing is brought closer, that is, screwed up more tightly, to the hub-portion $c$, then the lever arm $f'$ $g$ (Fig. 4) departs further from parallelism with the horizontal or the geometrical axis of the clutch, that is to say, the rotating weights cannot now move to their full extent, since, with the clutch in gear, their centres of gravity lie on a smaller circle of rotation than before, with the result that their linear speed and their centrifugal force are reduced, which further diminishes their compressive action on the clutch plates. The pressure of the clutch can thus be varied within wide limits by a simple relative axial adjustment of the clutch and the lever housing. If for the purpose of diminishing the pressure in comparison with the clutch position shown in Fig. 4, an adjustment is effected in such a way as to reduce the available movement of the lever $f$, then $x^2$ will be increased to a value intermediate between the indicated values $x^2$ (Fig. 4) and $x'$ (Fig. 3), that is, the effect of the spring $m$ in acting against centrifugal force is increased. This, however, is not a disadvantage, since the purpose of the adjustment considered is to cause the weight lever $f'$ $g$ to bear against the end plate $c^2$ with diminished pressure.

Adjustment can also be effected by varying the distance of the centres of gravity of the weights from their pivotal points, or the strength of the springs may be altered; obviously, both these adjustments can be used simultaneously in the same coupling. Changes in position of the centres of gravity of the weights are readily obtained by varying the shape of the weights.

A useful modification of the clutch may be obtained by arranging some of the weights to come into action at one predetermined speed, and the remainder at other higher predetermined speeds. For instance, there may be nine weights as shown in Figure 5 with their pivotal points all in one plane and spaced apart from one another at intervals of 40° each. Three of these weights $f^x$ may be arranged to come into action at one speed, say 1300 revolutions per minute, while the remaining six $f^{xx}$ do not come into action until 1400 revolutions per minute is reached.

This modification is especially useful when using the clutch to transmit the driving effort of an induction motor adapted to be connected to a power supply either in star or mesh connection at will. In such a case the full load must not be allowed to come into action when the connections are of the star type, or else the speed of the motor if under load will diminish considerably; also in such a case when switching over into mesh connection, an undesirably heavy current is again produced. In order to provide for this, some of the centrifugal weights may be adapted to take up as much of the load as is desirable for a star connection while the remaining weights may be so adapted as not to function until the full normal speed of rotation of the motor corresponding to the mesh connection is reached.

The modified form of clutch in which the driving torque is adapted to come into action successively at different speeds is not confined in its application to motors that can be connected either in star or mesh at will, but is also of use with ordinary motors, as the low starting torque acts to prevent overheating of the clutch when the speed of slip in the clutch is highest.

What I claim and desire to secure by Letters Patent is:—

1. A centrifugal friction clutch comprising driving and driven elements, a multiple disc member for bringing said elements into driving relation, a lever housing axially adjustable on said driving element, weighted levers pivotally mounted in said lever housing, arms one on each of said weighted levers for exerting pressure on the multiple disc member to actuate the clutch as the said arms approach towards parallelism with the rotary axis of the clutch, the centres of gravity of said weighted levers at the same time moving away from said rotary axis, and springs opposing the centrifugal forces and whose leverage decreases as said lever arms approach towards parallelism with the clutch axis, whereby the axial adjustment of the lever housing away from the driving element simultaneously increases the toggle action of the arms of the weighted levers, increases the radii at which the centrifugal forces on the weights act, and decreases the opposing effect of the springs, all acting cumulatively to increase the maximum torque that can be transmitted by the clutch.

2. A centrifugal friction clutch as claimed in claim 1, in which the centre of gravity of each weighted lever in its clutch producing position is closer to the rotary axis of the clutch than the pivotal point of said weighted lever, whereby the leverage at which the centrifugal forces on the weights act also increases simultaneously with the toggle action of the arms of said weighted levers.

3. A centrifugal clutch comprising driving and driven elements, weighted levers pivotally mounted on the driving element, arms one on each of said weighted levers for exerting pressure between the driving and driven elements to actuate the clutch, the centres of gravity of said weighted levers being such that the leverage of the centrifugal forces acting on the weighted levers increases as said levers move outward from the rotary axis in applying the clutch, and springs opposing the centrifugal forces and arranged so that their leverage decreases as the weighted levers move outward from the rotary axis.

4. A centrifugal clutch comprising driving and driven elements, a disc member for bringing said elements into driving relation, a lever housing on said driving element, weighted levers pivotally mounted in said lever housing, arms one on each of said weighted levers for exerting pressure on the disc member to actuate the clutch, the centres of gravity of said weighted levers being such that the leverage of the centrifugal forces acting on the weighted levers increases as said levers move outward from the rotary axis in applying the clutch, and springs connecting the weighted levers to the lever housing and opposing the centrifugal forces and arranged so that their leverage decreases as the weighted levers move outward from the rotary axis.

5. A centrifugal friction clutch comprising driving and driven elements, a disc member for bringing said elements into driving relation, a lever housing axially adjustable on said driving element, weighted levers pivotally mounted in said lever housing with their centres of gravity closer than their pivot points to the rotary axis of the clutch and normally offset only slightly from the clutch radii passing through the pivot points, arms one on each of said weighted levers for exerting pressure on the disc member to actuate the clutch as the said arms approach towards parallelism with the rotary axis of the clutch, the centres of gravity of said weighted levers at the same time moving away from said rotary axis, and springs opposing the centrifugal forces and whose leverage decreases as said lever arms approach towards parallelism with the clutch axis, whereby the axial adjustment of the lever housing away from the driving element simultaneously increases the toggle action of the arms of the weighted levers, increases the radii at which the centrifugal forces on the weights act, and decreases the opposing effect of the springs, all acting cumulatively to increase the maximum torque that can be transmitted by the clutch.

6. A centrifugal clutch comprising driving and driven elements, weighted levers pivotally mounted on the driving element, arms one on each of said weighted levers for exerting pressure between the driving and driven elements to actuate the clutch, the positions of the centres of gravity of said weighted levers being such that the leverage of the centrifugal forces acting on the weighted levers increases as said levers move outward from the rotary axis of the clutch, springs opposing the centrifugal forces and arranged so that their leverage decreases as the weighted levers move outwards from the rotary axis, and means for adjusting the position of said levers on the driving element to regulate the pressure exertable by the aforesaid arms.

7. A centrifugal clutch comprising driving and driven elements, weighted levers pivotally mounted on the driving element, arms one on each of said weighted levers for exerting pressure between the driving and driven elements to actuate the clutch, the centre of gravity of each weighted lever being nearer than its pivot point to the axis of rotation of the clutch and normally only slightly offset from the clutch radius passing through said pivot point, said weighted levers being also such that the leverage of the centrifugal forces acting on them increases as they move outwards from the rotary axis of the clutch, and spring leverage means which hold the weighted levers when at rest in the aforesaid position of slight offset and also during rotation until attainment of a predetermined speed beyond which the said spring means yield and decrease in leverage as the weighted levers move outwards from the rotary axis.

8. A centrifugal clutch comprising driving and driven elements, weighted levers differing in centrifugal sensitiveness and pivotally mounted on the driving element, arms one on each of said weighted levers for exerting pressure between the driving and driven elements to actuate the clutch, the centres of gravity of said weighted levers being such that the leverage of the centrifugal forces acting on the weighted levers increases as said levers move outward from the rotary axis in applying the clutch, and springs opposing the centrifugal forces and arranged so that their leverage decreases as the weighted levers move outward from the rotary axis.

9. A centrifugal clutch comprising driving and driven elements, a disc member for bringing said elements into driving relation, a lever housing on said driving element, weighted levers differing in centrifugal sensitiveness and pivotally mounted in said lever housing, arms one on each of said weighted levers for exerting pressure on the disc member to actuate the clutch, the centres of gravity of said weighted levers being such that the leverage of the centrifugal forces acting on the weighted levers increases as said levers move outward from the rotary axis in applying the clutch, and springs connecting the weighted levers to the lever housing and opposing the centrifugal forces and arranged so that their leverage decreases as the weighted levers move outward from the rotary axis.

In testimony whereof I have signed my name to this specification.

H. H. BENN.